United States Patent [19]

Misra et al.

[11] Patent Number: 4,999,078

[45] Date of Patent: * Mar. 12, 1991

[54] REDUCING BLOCKING AND INCREASING FLOW OF PLASTICIZED POLYVINYL BUTYRAL SHEET

[75] Inventors: Ashok Misra, New Delhi, India; Donald J. David, Amherst; Arijit M. DasGupta, Holyoke, both of Mass.

[73] Assignee: Monsanto Company, St. Louis, Mo.

[ * ] Notice: The portion of the term of this patent subsequent to Mar. 12, 2008 has been disclaimed.

[21] Appl. No.: 268,317

[22] Filed: Nov. 7, 1988

[51] Int. Cl.$^5$ .................................................. C09J 0/00
[52] U.S. Cl. ...................................... 156/327; 525/61; 264/331.22
[58] Field of Search ........................... 525/61; 156/327; 264/331.22

[56] References Cited

U.S. PATENT DOCUMENTS

| | | |
|---|---|---|
| 2,187,570 | 1/1940 | Kranzlein et al. ...................... 525/61 |
| 2,269,166 | 3/1939 | Salo ........................................ 525/61 |
| 2,728,745 | 12/1955 | Smith et al. ............................. 525/61 |
| 3,023,182 | 2/1962 | Tanabe et al. .......................... 525/61 |
| 3,071,466 | 1/1963 | Klockgether et al. ................. 525/61 |
| 3,100,199 | 8/1963 | Fordham et al. ....................... 525/61 |
| 3,210,147 | 10/1965 | Johnson et al. ......................... 525/61 |
| 3,322,855 | 5/1967 | Fukushima et al. ................... 525/61 |

FOREIGN PATENT DOCUMENTS

| | | | |
|---|---|---|---|
| 0283180 | 9/1988 | European Pat. Off. ............... | 525/61 |
| 0785164 | 10/1957 | United Kingdom ................... | 525/61 |

OTHER PUBLICATIONS

"Synthetic Color-Forming Photographic Colloids", McQueen, D. M. and Woodward, D. W.-Journal of American Chemical Society, vol. 73, 4930 (1951).

"3-Acyloacetamidobenzaldehyde. Ethylene Glycol Esters", Corner, J. O. and Martin, E. L.-Journal of American Chemical Society, vol. 76, 3953 (1954).

*Primary Examiner*—Joseph L. Schofer
*Assistant Examiner*—J. M. Reddick
*Attorney, Agent, or Firm*—Michael J. Murphy; William J. Farrington

[57] ABSTRACT

A process for increasing both resistance to blocking and flow during laminating of plasticized polyvinyl butyral sheet which comprises incorporating into the formulation of the sheet a block-reducing and flow-promoting amount, preferably up to about 10 mole %, of ionomeric groups chemically bound to oxygen atoms of adjacent precursor vinyl alcohol groups.

17 Claims, No Drawings

REDUCING BLOCKING AND INCREASING FLOW OF PLASTICIZED POLYVINYL BUTYRAL SHEET

BACKGROUND OF THE INVENTION

This invention relates to plasticized polyvinyl butyral sheet for safety glazing and more particularly to a process for improving its use performance.

Plasticized polyvinyl butyral sheet is very well known as an interlayer for use with glass or rigid plastic panels in laminated safety glazing assemblies. The polyvinyl butyral resin is more particularly partial polyvinyl butyral insofar as containing about 15 to about 30 percent by weight residual hydroxyl groups which promote adherence of the sheet to the glass or plastic. Such polyvinyl butyral or partial polyvinyl butyral, (interchangeably referred to as PVB), is conventionally prepared by partially acetalizing polyvinyl alcohol (PVOH) with butyraldehyde. The PVB is then conventionally mixed with plasticizer and melt processed into sheeting which is usually collected and stored in roll form before use. In use, sections for individual glazing units are cut from the roll, placed between or adjacent one or more laminating panels and the sandwich pressed together in an autoclave at elevated temperature and pressure to form the laminate.

Plasticized PVB sheet used in this way inherently tends to stick to itself (sometimes called "blocking") at ambient temperatures typically encountered during storage before laminating. Expensive precautions have been taken to prevent this. For example, the sheet has been transported and stored at low refrigeration temperatures, or interleaved with polyethylene film or dusted between facing layers with sodium bicarbonate. It has been and continues to be very desirable to alleviate this blocking problem associated with plasticized PVB sheet.

Another problem occurs during laminating when incomplete contact exists between the PVB sheet and the contiguous laminating panel. This is caused by thickness tolerance variations in the sheet and laminating panel and results in visually apparent, local, unlaminated patches appearing as bubbles. In the past, when these patches appeared on laminating lines the problem was overcome by extending the autoclave cycle to heat the sheet to a higher temperature to promote greater polymer flow. But this undesirably results in increased energy costs and imposes a capacity-affecting limitation on laminating lines. Tailoring the sheet polymer modulus to promote slight additional flow into an uneven area of the gap between the sheet and opposing panel could alleviate the problem. But this works at cross purposes with minimizing sticking of the sheet to itself before laminating. In other words, reducing modulus to promote flow during laminating will undesirably increase stickiness at ambient temperature. On the other hand, increasing ambient temperature modulus to stiffen the sheet enough to resist sticking will decrease flow during laminating. Yet optimum flow during laminating is increasingly important in vehicle glazing applications as the amount of glass per vehicle is increased.

It would be very desirable to simultaneously favorably influence each of these problem areas associated with use of plasticized PVB sheet in laminated safety glazings and avoid performance trade-offs which have occurred in reducing one problem at the expense of the other. To the best of our knowledge, however, such corrections have not been provided in the prior art.

SUMMARY OF THE INVENTION

Now improvements have been made to increase the ambient temperature resistance of PVB sheet to blocking while simultaneously improving its flow during lamination.

Accordingly, a principal object of this invention is to chemically modify PVB resin so that when used as a sheet for safety glazings the usual stack or roll sticking and laminate flow problems are reduced or eliminated.

A specific object is to separately or simultaneously reduce blocking and increase laminating flow.

Another object is to achieve the foregoing objects without significantly departing from conventional ways of synthesizing PVB resin, forming plasticized PVB sheet and laminating such sheet with other panels to form a safety glazing.

These and other objects are accomplished by providing a new species of PVB resin which contains ionomeric groups capable of providing thermally reversible ionic crosslinks ("ionomeric PVB" abbreviated as "IPVB"). More specifically, at low ambient temperatures (ca 40-60° C.) where sticking problems occur, such temperature-dependent ionic crosslinks are inherently established to promote block resistance whereas at elevated laminating temperatures where flow is important, such linkages are inherently severed to promote flow into uneven portions of the gap between the sheet and opposing laminating panel(s).

The IPVB resin contains a modification-promoting amount of ionomeric groups chemically combined therein, preferably to oxygen atoms of adjacent precursor vinyl alcohol groups. Such ionomeric groups are preferably present at up to about 15 and most preferably about 2 to about 5 mole percent. The ionomeric groups are bound into the PVB preferably through the reaction between an aldehyde group and two hydroxyl groups. A particularly preferred ionomeric group is the metal sulfonate salt of an aldehyde.

In a more specific aspect a process is provided for increasing the resistance to blocking of plasticized polyvinyl butyral sheet containing residual hydroxyl groups which comprises incorporating into the formulation from which the sheet is made a blockreducing amount of ionomeric groups chemically bound to oxygen atoms of adjacent precursor vinyl alcohol groups. Also provided is a process for increasing the flow of plasticized polyvinyl butyral sheet containing residual hydroxyl groups during lamination with glass layers which comprises incorporating into the formulation from which the sheet is made a flow promoting amount of ionomeric groups chemically bound to oxygen atoms of adjacent precursor vinyl alcohol groups.

DETAILED DESCRIPTION OF THE INVENTION

IPVB resin is an ionized copolymer comprising a major component of a non-ionic backbone of partial PVB containing 65-95 weight percent vinyl butyral units, 15 to 30 weight percent hydroxyl groups calculated as vinyl alcohol and 0 to 5 percent vinyl ester units (calculated as vinyl acetate) and a minor component of an ionizable or ionic comonomer. The latter minor component distinguishes IPVB from partial PVB traditionally used in sheeting for glazing applications and is provided by chemically modifying the polyvinyl alcohol in conjunction with acetalization with butyraldehyde to form the non-ionic partial PVB resin backbone. PVOH modification is done through attachment of ionic acidic groups to a pair of hydroxyl groups of the PVOH to form a modified PVOH precursor to the IPVB. This modification is done by the chemical condensation reaction of PVOH and, preferably, an ionic aldehyde. This is illustrated by the following reaction where the acidic groups are ionic sulfonated benzal groups obtained by reacting PVOH with the sodium salt of 2-formyl benzene sulfonic acid (BSNA) having the following structural formula:

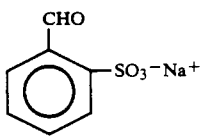

The PVOH reaction in the presence of $HNO_3$ catalyst is illustrated as follows:

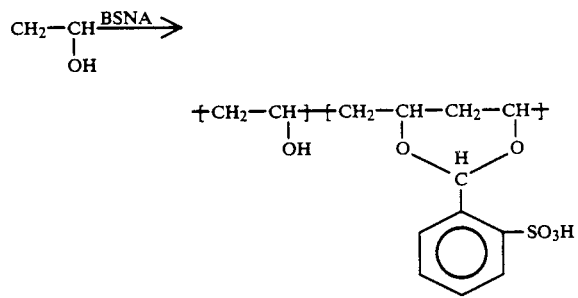

Usable PVOH (either a single grade or two or more grades blended together) are commercially available, for example from Air Products and Chemicals, Inc. or E. I. du Pont de Nemours & Co., Inc. They are characterized by degree of polymerization (DP) which ranges from about 350 to 2500 to provide PVOH molecular weight from 15,000 to 110,000. As an optional feature, low molecular weight PVOH having a DP of 350 to 800 and a molecular weight of about 15,000 to about 35,000 can be used when certain ionomeric components (described hereinafter) are used and the PVOH-ionomeric and acetalization reactions are conducted at low temperature below 20° C. Such low molecular weight PVOH has traditionally not been sufficiently reactive with butyraldehyde to make PVB due to the physical nature of the material which causes it to agglomerate. Its use is desirable since in furtherance of the objects of this invention the correspondingly low molecular weight PVB formed will be "softer" and flow better at laminating temperatures while, due to the presence of ionomeric groups, being stiffer and more block resistant at ambient temperatures in comparison with results using all medium or high molecular weight PVOH (and resulting high molecular weight PVB). Medium to high molecular weight PVOH's have a DP of about 810 to 15,000 and a molecular weight of about 35,500 to about 110,000.

The modified PVOH containing the ionic acid groups is acetalized under aqueous or solvent acetalization conditions by reacting the PVOH precursor with butyraldehyde in the presence of an acid catalyst. The acetalized reaction product is then neutralized to form the polymer salt. Nautralization need not be complete in that some unneutralized product in acid form can be present but neturalization has to be sufficient to give the ionic associations in use which are later more completely described. Nautralization is effected by adding metal ions such as $Na^+$, $K^+$, $Ca^{++}$, $Ba^{++}$, $Zn^{++}$, $NH_4^+$ etc. to the reaction medium. Using the precursor shown above, this is illustrated by the following reactions to form one species of IPVB according to the invention:

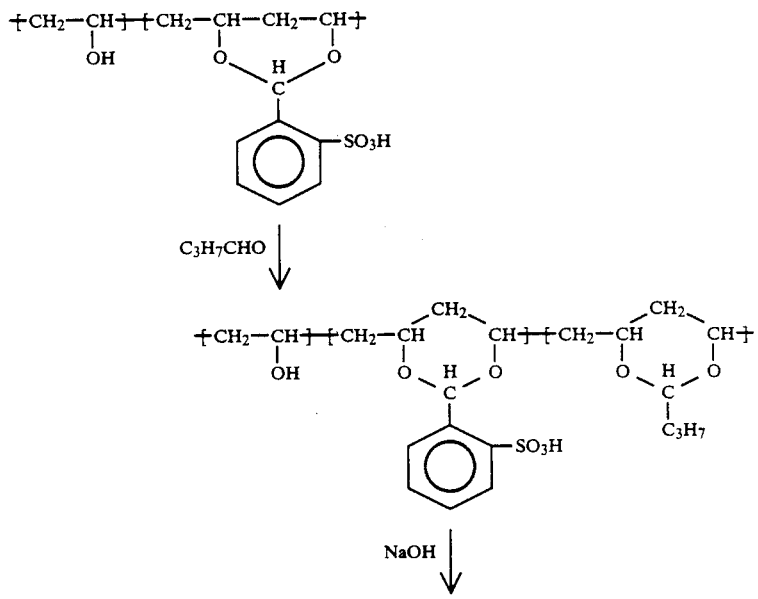

-continued

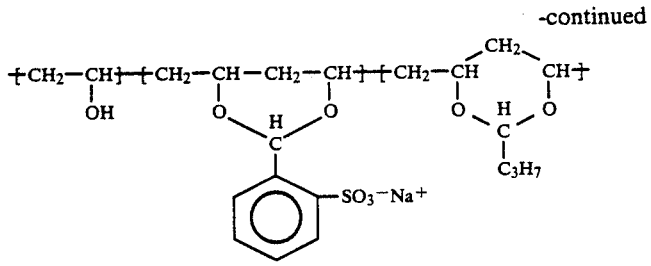

The ionomeric groups of the foregoing IPVB species are present as the sodium salt of sulfonated polyvinyl benzal chemically bound to oxygen atoms of adjacent precursor vinyl alcohol groups formed initially through reaction between a CHO aldehyde group of the BSNA ionomeric constituent and two hydroxyl groups on a PVOH molecule.

In a solvent process acetalization occurs in the presence of acid catalyst and sufficient solvent to dissolve the modified PVB formed and produce a homogeneous solution at the end of acetalization. The modified PVB is separated from solution by precipitation of solid particles with water which are then washed, neutralized and dried. Solvents used are lower aliphatic alcohols, such as ethanol.

In an aqueous process, acetalization occurs by adding butyraldehyde to a water solution of modified PVOH in the presence of an acid catalyst, agitating the mixture to cause the modified PVB to precipitate in finely divided form and continuing agitation until the reaction mixture has proceeded to the desired end point.

Acetalization with butyraldehyde in a solvent or aqueous process is preferably carried out in situ with the PVOH reaction through which the ionic acidic groups had previously been attached to the PVOH molecules. This is achieved by adding butyraldehyde directly to the reaction zone to commence condensation with the modified PVOH after the desired amount of PVOH has reacted with the ionic component. Depending on the chemical nature of the compound selected to provide the ionomeric bonds, it may be possible to carry out the ionomeric reaction with PVOH and the acetalization reactions simultaneously. It is preferred, however, to conduct these reactions sequentially in situ when the reaction rate with PVOH of the butyraldehyde significantly exceeds that of the ionomeric constituent, as is the case when a substituted aldehydic aromatic salt is used to provide the ionomeric groups.

The extent of modification of the starting PVOH and the content of ionomeric groups in the IPVB product can vary widely as a function of the extent of the reaction of the PVOH and the ionic-containing component. Generally, satisfactory results are obtained when the modified PVOH precursor contains up to about 15, preferably up to about 10 and most preferably 2 to 5 mole percent acidic ionic groups and the IPVB resin similarly contains up to about 15, preferably up to about 10 and most preferably 2 to 5 mole percent ionomeric groups obtained from the modified PVOH precursor.

The temperature of the PVOH reaction should be adequate to reactively bind the desired amount of acidic ionic groups to the PVOH and will vary with the ionomeric component chosen. When a substituted aldehydic aromatic salt is used, such as the preferred BSNA, the temperature throughout the PVOH and acetalization reactions should be below 20° C., preferably between 8–15 and most preferably 10°–12° C.

The IPVB resin of the invention contains a modification-promoting amount of chemically combined ionomeric groups. Insofar as the chemical reaction of the ionic component with polyvinyl alcohol to later produce thermally reversible crosslinks in PVB formed from such modified PVOH, the ionic component, must contain: (i) an active group capable of interacting with two hydroxyl groups of a PVOH molecule to chemically bind the ionic component to the PVOH molecule and (ii) an acid group capable in use (i.e. after the modified PVOH precursor is acetalized with butyraldehyde and neutralized) of forming thermally reversible pseudo cross-links with equivalent ionomeric groups on other similarly modified PVOH chains. With this in mind, the chemical structure of the ionic component can vary broadly and is represented by the formula R-XYZ-M where R is the active group referred to above, X and Y are substituents of certain of such active groups, Z is the acid group referred to above and M is a metal cation. More specifically, R equals an aromatic, aliphatic (straight chained, branched or cyclic) or heterocyclic i) aldehyde (i.e. containing a —CHO group), (ii) acid (i.e. containing a —COOH group), (iii) acid chloride (i.e. containing a —COCl group) or iv) isocyanate (i.e. containing an —NCO group), provided that when R is aliphatic it has the configuration $(CH_2)_n$ where n is an integer from 1 to 200; X and Y, which can be the same or different, are substituents on the aromatic and heterocyclic forms of (i), (ii), (iii), and (iv) and are H or $C_1$ to $C_5$ alkyl; Z is $SO_3^-$, $COO^-$, or $PO_4^{-3}$, and M is a cation selected from alkali metals (Group IA in the Periodic Table), alkaline earth metals (Group IIA of the Periodic Table) and transition metals selected from zinc, copper and manganese. Alkali metals are Li, Na, K, Rb, Cs and Fr; alkaline earth metals are Be, Mg, Ca, Sr, Ba, and Ra. The foregoing description of the ionic component is further depicted in the following table:

| | Aromatic | Aliphatic (straight chain/ branched or cyclic) | Heterocyclic |
|---|---|---|---|
| Aldehyde | CHO, Y-⟨⟩-X, ZM (aromatic ring) | MZ-(CH$_2$)$_n$-CHO  n = 1-200 | CHO, Y-/-X, O, ZM (heterocyclic) |
| Acid | COOH, Y-⟨⟩-X, ZM | MZ-(CH$_2$)$_n$-COOH | COOH, Y-/-X, O, ZM |
| Acid Chloride | COCl, Y-⟨⟩-X, ZM | MZ-(CH$_2$)$_n$-COCl | COCl, Y-/-X, O, ZM |
| Isocyanate | NCO, Y-⟨⟩-X, ZM | MZ-(CH$_2$)$_n$-NCO | NCO, Y-/-X, O, ZM |

Preferred ionic components are those where R is an aromatic aldehyde, X and Y are H, Z is $SO_3^-$ and M is $Na^+$. The most preferred ionic component is the sodium salt of 2-formylbenzene sulfonic acid, i.e.

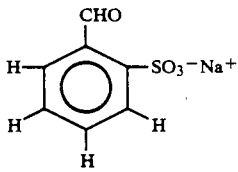

which is commercially available from Aldrich Company of Eastman Kodak Company.

IPVB resin of the invention has use in unblended form (i.e. 100% basis), as a blending concentrate or intermediate in forming sheeting for glazing applications: using high molecular weight PVOH as a starting material (DP 1275 to 1600), it may be possible to shape the resulting IPVB directly into sheeting without blending. It is preferably blended, usually in minor amount (less than 50 wt. %), with unmodified partial PVB. The amount of IPVB blended with PVB is dictated by the level of ionomeric groups in the IPVB and the performance properties desired in sheet formed from the polyblend. Based on economically reasonable reaction rates with the ionomeric component in forming IPVB, the IPVB component should be present at from about 1 to about 45 weight % (based on total PVB) in the polyblend. Above 45 wt. % the blend is usually too stiff in flow whereas the improvement in sheet performance properties is negligible at less than 1 weight %. The preferred level of IPVB in the polyblend (at 2-5 mole % ionomeric content in the IPVB) is about 10 to about 30 wt. % and most preferably about 20 wt. %. Typical viscosities (7.5% in methanol at 20° C.) of "soft" flow polyblends according to the invention (at 10 to 30 wt. % IPVB) are about 100 to 180 cps as contrasted with about 230 cps for conventional unmodified PVB made from high molecular weight PVOH. A particularly preferred polyblend composition at the ratios just referred to comprises a low molecular weight IPVB (i.e. made from PVOH having a molecular weight of from about 15,000 to about 35,000) and an unmodified high molecular weight PVB (i.e. made from PVOH having a molecular weight of 50,000 to 110,000). Such a blend particularly optimizes the enhanced performance properties in the resulting sheet in that the low molecular weight IPVB promotes high temperature flow with reduced blocking while the high molecular weight PVB provides good impact absorption in a laminate containing such a sheet.

Blending IPVB and PVB can be done with conventional dry blending equipment before combination with plasticizer or preferably with the plasticizer and optional other additives in a conventional high intensity mixer. The polyblend containing IPVB must be plasticized with from about 20 to 80 parts plasticizer per 100 parts of resin blend and more commonly between 25 and 45 parts for conventional laminated safety glass use. This latter concentration is generally used when the PVB components of the blend each contain about 15 to about 30 percent vinyl alcohol by weight. In general, plasticizers commonly employed are esters of a polybasic acid and a polyhydric alcohol. Particularly suitable plasticizers are triethylene glycol di-(2-ethylbutyrate), dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates such as disclosed in U.S. Pat. No. 4,144,217. Other suitable plasticizers are well known or will be obvious to those skilled in the art.

The preferred process for preparing PVB sheet according to the invention involves mixing the polyblend with plasticizer as noted above and melt processing the plasticized polyblend according to known conventional prior art techniques to form the sheet. Systems for forming such sheet typically involve extrusion by forcing polymer melt through a sheeting die having temperature-controlled die lips or by using a die roll system where molten polymer issuing from the die is cast onto a specially prepared surface of a roll closely adjacent to the die exit which imparts the desired surface characteristics to one side of the molten polymer. Thus, a roll having a surface with minute peaks and valleys forms a sheet from polymer cast thereon with a rough surface generally conforming to the valleys and peaks of the surface. Further details of construction of a die roll system are disclosed in U.S. Pat. No. 4,035,549, col. 3, line 46 through col. 4 line 4, the content of which is incorporated herein by reference.

Alternative conventional techniques known to those skilled in the art may be employed in association with an extrusion process to produce a rough surface on either or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. Nos. 2,904,844; 2,909,810; 3,994,654; 4,575,540 and published European Application No. 0185,863.

In addition to plasticizers, the PVB sheet may contain other additives such as dyes, ultra violet light stabilizers, adhesion control salts, antioxidants and the like. The sheet may also be provided with an integral, gradient color band during extrusion by known systems as typically disclosed in U.S. Pat. No. 4,316,868. The sheet of the invention preferably compromises a single layer but could be provided as a multi-layer structure obtained, for example, by coextruding an IPVB layer with or coating an IPVB layer on a conventional PVB sheet of the same or different gage thickness. For example, a layer of IPVB could be compression molded onto a conventional PVB sheet or IPVB resin could be dissolved in a solvent, dip or roll-coated onto a conventional sheet followed by solvent evaporation, or an IPVB layer could be fused to a conventional sheet during laminating with other panels forming the safety glazing at elevated temperature and pressure. Alternatively, the coextruded, coated or fused layer could be formed of a polyblend as previously described.

The plasticized PVB sheet containing residual hydroxyl groups has a block-reducing, flowpromoting amount of ionomeric groups chemically bound to oxygen atoms of adjacent precursor vinyl alcohol groups incorporated into the formulation from which it is made. These ionomeric groups provide thermally reversible pseudo cross-links with equivalent ionomeric groups on other similarly modified PVOH chains of the partial PVB of the sheet. More specifically, subsequent to acetalization with butyraldehyde, and after neutralization with NaOH one species of IPVB of the invention can be schematically depicted as follows:

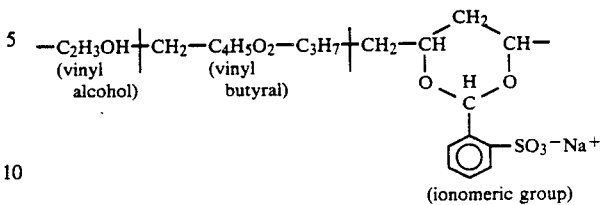
(ionomeric group)

Regarding the mechanism of formation of the pseudo crosslinks, it is postulated that even though, as depicted above, a cation and anion exist on each ionomeric group, there is still an affinity of the cation and anion of any particular group for competing cation and anion groups on closely adjacent ionomeric groups. This can be schematically depicted as follows where, for simplification, only the ionomeric groups of the IPVB molecule are shown:

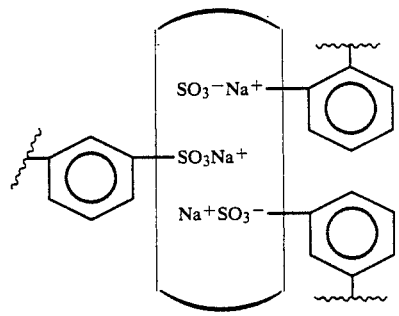

It is felt that this affinity results in clusters or aggregates of ionomeric groups which form the thermally reversible bonds. More specifically, in the absence of sufficient heat energy to overcome the attraction between adjacent ionomeric groups, the bonds exist to provide the reduced ambient temperature blocking property to the sheet of which they are a part. At higher laminating temperatures, however, when the sheet is being conformed to the space between closely adjacent layers of glass, (or equivalent) the bonds rupture resulting in increased flow than if (theoretically) they existed at such high temperatures to provide stiffer flow. PVB sheet of the invention exhibiting (i) improved block resistance has a storage modulus at 40° C. of greater than $6 \times 10^6$ dynes/cm$^2$ and (ii) increased flow at laminating temperatures as represented by a storage modulus at 150° C. of less than $5 \times 10^5$ dynes/cm$^2$.

The following tests were conducted on specimens prepared according to specific examples presented hereinafter.

(1.) Near Infrared Spectroscopy (NIR) to measure residual PVOH groups in the IPVB.

(2.) Nuclear Magnetic Resonance Spectroscopy (NMR) and Infrared Spectroscopy (IR) to confirm the presence of ionomeric groups.

(3.) Differential Scanning Calorimeter (DSC) to measure polymer glass transition temperature (Tg).

(4.) Storage Modulus using a Rheometrics Dynamic Mechanical Spectrometer. This test measures the amount of energy stored in the polymer as a function of temperature. The values at 40 and 60° C. (hereinafter G'(40) or (60)) provide an indication of stiffness at ambient sheet-handling temperatures and are used to predict the tendency of the material to stick to itself. The value at 150° C. (hereinafter G'(150)) provides an indication of flow behavior of the material at higher autoclave temperatures during lamination with glass layer(s).

(5.) Haze using a Hunter Haze Meter is a measure of the optical clarity of a standard glass laminate (two glass layers) using a particular plasticized formulation as the interlayer.

18.4% was blended with the ionomeric PVB resin of Example 1 at various weight ratios of ionomeric PVB/conventional PVB (IPVB/RB). The blended resins were mixed with dihexyl adipate (DHA) at 32.7 parts plasticizer per hundred parts of resin blend. The plasticized resin blends were compacted in a press at 148.9° C. into "baby cakes". Analytical results obtained were as follows:

| Sample | $G' \times 10^6$ (60° C.) dynes/cm$^2$ | $G' \times 10^5$ (150° C.) dynes/cm$^2$ | Inherent Roll Blocking Avg Load (lbs) | Haze (%) |
|---|---|---|---|---|
| RB (control) | 4.15 | 7.12 | 0.67 | 1.14 |
| 10/90 IPVB/RB | 4.03 | 5.05 | 0.55 | 0.93 |
| 20/80 IPVB/RB | — | — | 0.37 | 1.19 |
| 30/70 IPVB/RB | 4.19 | 3.91 | 0.32 | 1.58 |
| IPVB (100%) | 6.73 | 3.05 | — | — |

(6.) Inherent Blocking is the average load in pounds required to separate two strips in face-to-face contact of the same sample from themselves. Sample strips are pressed together under 2.5 tons (2.27 t) ram pressure for 15 minutes. Using an Instron peel tester, a T-type peel test was then run on each sample at a crosshead speed of 20 in (50.8 cm) per minute and a chart speed of 5 in (12.7cm) per minute.

Exemplary of the invention are the following specific examples wherein parts and percentages are by weight unless otherwise indicated.

EXAMPLE 1

Synthesis of Ionomeric Polyvinyl Butyral

A) Polyvinyl Alcohol Precursor

Polyvinyl alcohol (PVOH) resin having a residual polyvinyl acetate content of less than 2% and a molecular weight of 23,000 was dissolved with agitation in water at 85°-90° C. to form an 8.3% solution. 7794.6 g of this PVOH solution was charged to an agitated fluted reactor and its temperature adjusted to 10°-12° C. To this was added 66.4 g of o-benzaldehyde sulfonic acid sodium salt (BSNA), and 171.7 g of a 35% solution of nitric acid. The mixture was held at 10°-12° C. for two hours. Analysis of a sample of the reaction product showed 1 to 3 mole % of the acid had chemically combined with the PVOH.

B) Ionomeric Polyvinyl Butyral

At the end of the noted two hours, and while the temperature in the reaction zone was kept at 10°-12° C., 450.6 g of butyraldehyde were added to the modified PVOH mixture which was then allowed to react at 10°-12° C. with agitation for 4.5-5.5 hrs. The reactor contents were washed with water once, neutralized with 50% sodium hydroxide to a pH of 11.5-12.0, held at this pH for 1.5 hours at room temperature and then washed again with water to a final pH of 7.5 to 8.0. The product was then filtered and dried to less than 2% moisture. Analysis of the product gave the following results:
Residual PVOH groups: 18-19%
BSNA groups in the polymer: 1 to 3 mole %
Tg: 75° C.

EXAMPLE 2

Blending Ionomeric and Conventional PVB's

Conventional PVB available from Monsanto as RB Butvar® resin having a residual PVOH content of The results show that blends containing IPVB are equivalent to the RB Control PVB in ambient temperature stiffness as measured by 60° C. Storage Modulus with 100% IPVB being the stiffest. On the other hand, the blends and pure IPVB exhibit superior flow at higher temperatures than the control PVB as measured by 150° C. Storage Modulus. Potential decrease in roll blocking of the blends is observed from the average load to separate two strips of the same sample from each other, i.e. less force is required for the blends than the control. Optical clarity of laminates prepared with interlayer from the blends is comparable to that of the control.

EXAMPLE 3

Sheet From Blend Containing Ionomeric PVB

A 25/75 IPVB/RB blend was mixed with 32 phr DHA in a non-fluxing (non-melting) high intensity Diosna mixer and, using a 4½ in (11.4 cm) diameter 32/1 L/D extruder, was extruded into sheeting 30 mils (0.76 mm) thick and 23 in (58.4 cm) wide. Melt temperature was 390°-400° F. (198.9°-204.4° C.). Extrusion was through a die opening onto the surface of an adjacent rotating die roll of the type previously described provided with internal cooling means to regulate the temperature of a die blade in contact with the polymer melt at about 115.5° C. Melt pressure at the die was 2412-3100 kPa. Sheet issuing from the die roll at about 4.6 m/min was passed into a water cooling bath at 10° C. The die lip of the die opening was formed with a compression angle of about 4 degrees. Each side of the formed sheet had a rough surface the blade side measuring (Rz) $45 \times 10^{-5}$ in Or $114 \times 10^{-5}$ cm and the roll side $64 \times 10^{-5}$ or $162.6 \times 10^{-5}$ cm. Roughness was measured with a profilometer such as Model C59 Perthometer from Mahr Gage Co., New York.

The following Storage Modulus results (dynes/cm$^2$) at various temperatures were obtained on sheet samples prepared as described above from various blends of IPVB/RB.

| Sample | G' (26° C.) × 10$^7$ | G' (40° C.) × 10$^6$ | G' (60° C.) × 10$^6$ | G' (150° C.) × 10$^5$ |
|---|---|---|---|---|
| RB (100%) | 3.27 | 5.73 | 4.09 | 5.98 |
| IPVB/RB (10/90) | 4.37 | 6.12 | 3.94 | 6.05 |
| IPVB/RB (20/80) | 4.54 | 6.76 | 4.06 | 4.97 |
| IPVB/RB (25/75) | 5.29 | 7.72 | 4.21 | 4.26 |

| Sample | G' (26° C.) × 10⁷ | G' (40° C.) × 10⁶ | G' (60° C.) × 10⁶ | G' (150° C.) × 10⁵ |
|---|---|---|---|---|
| IPVB/RB (30/70) | 5.42 | 9.35 | 3.91 | 3.83 |

The above results clearly show that blends containing IPVB are stiffer at 26 and 40° C. based on Storage Modulus yet more flowable at 150° C. than the RB control. At 60° C., since the values differ only by about 4% from the control, performance is predicted to be essentially comparable.

EXAMPLE 4

Alternative Ionomeric Constituent

This example shows the use of an acid aldehyde in the synthesis of ionomeric PVB. The aldehyde used was p-carboxybenzaldehyde (CBA) having the following chemical structure:

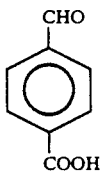

Since CBA is ethanol soluble, the PVOH and acetalization reactions were carried out in ethanol.

11 g CBA was dissolved in 280 ml of ethanol in an agitated 2 liter reactor and 53.9 g of PVOH (Goshenol NH-18) added to form a PVOH slurry in ethanol. A few drops of concentrated sulfuric acid catalyst were added until pH was less than one. The slurry was heated to 75° C. and refluxed for 2 hours; 34.0 g of n-butyraldehyde was then added and allowed to react at 75° C. for four hours. The reactor contents was then neutralized with sodium hydroxide to a pH of 12.5 and dumped into water to cause polymer to precipitate. It was then filtered and dried as in Example 1 and found to have a Tg of 90.7° C. (versus 73° C. for conventional control PVB). IR spectroscopy results showed the presence of COOH groups prior to neutralization with caustic and COO⁻ peaks in the resin after neutralization.

CONTROL EXAMPLE 1

This control Example illustrates the importance of low temperature in forming ionomeric PVB using BSNA.

The procedure of Example 1 was repeated except that reaction temperature was kept at 16° C. (preparation of precursor) and in part B (preparation of ionomeric PVB) up until gel break occurred (the first appearance of PVB particles) when the temperature was increased to and held at 85° C. for 4 hours. NMR analysis of the polymer product showed no evidence of chemical substitution of the BSNA. This is believed due to the 85° C. high temperature portion of the reaction cycle.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A process for increasing the resistance to blocking of plasticized polyvinyl butyral sheet containing residual hydroxyl groups which comprises incorporating into the formulation from which the sheet is made an effective block-reducing amount of ionomeric groups chemically bound to oxygen atoms of adjacent precursor vinyl alcohol groups.

2. The process of claim 1 wherein said formulation contains up to about 10 mole % ionomeric groups.

3. The process of claim 2 wherein the ionomeric groups are formed of a metal sulfonate salt of an aldehyde.

4. The process of claim 2 wherein said ionomeric groups are represented by the formula R-XYZ-M where R is aromatic, aliphatic or heterocyclic aldehyde, acid, acid chloride or isocyanate, provided that when R is aliphatic it has the configuration $(CH_2)_n$ where n is an integer from 1 to 200; X and Y, which can be the same or different, are substituents on the aromatic and heterocyclic forms of R and are H or $C_1$ to $C_5$ alkyl; Z is $SO_3^-$, $COO^-$ or $PO_4^{-3}$ and M is a cation selected from alkali metals, alkaline earth metals and transition metals selected from zinc, copper and manganese.

5. The process of claim 4 wherein R is aromatic aldehyde and Z is $SO_3^-$.

6. The process of claim 5 wherein the ionomeric groups are the sodium salt of 2-formylbenzene sulfonic acid.

7. The process of claim 6 including the step of placing said sheet in face-to-face contact with another identical sheet whereby blocking is reduced as a result of crosslinks between ionomeric groups present in each of said sheets, each of said sheets having a 40° C. storage modulus value greater than $6 \times 10^6$ dynes/cm².

8. A process for increasing the flow of plasticized polyvinyl butyral sheet containing residual hydroxyl groups during lamination with glass layers which comprises incorporating into the formulation from which the sheet is made an effective flow-promoting amount of ionomeric groups chemically bound to oxygen atoms of adjacent precursor vinyl alcohol groups.

9. The process of claim 8 wherein said formulation contains up to about 10 mole % ionomeric groups.

10. The process of claim 8 wherein the ionomeric groups are formed of a metal sulfonate salt of an aldehyde.

11. The process of claim 8 wherein said ionomeric groups are represented by the formula R-XYZ-M where R is aromatic, aliphatic or heterocyclic aldehyde, acid, acid chloride or isocyanate, provided that when R is aliphatic it has the configuration (C where n is an integer from 1 to 200; X and Y, which can be the same or different, are substituents on the aromatic and heterocyclic forms of R and are H or $C_1$ to $C_5$ alkyl; Z is $SO_3^-$, $COO^-$ or $PO_4^{-3}$ and M is a cation selected from alkali metals, alkaline earth metals and transition metals selected from zinc, copper and manganese.

12. The process of claim 11 wherein R is aromatic aldehyde and Z is $SO_2^-$.

13. The process of claim 12 wherein the ionomeric groups are the sodium salt of 2-formylbenzene sulfonic acid.

14. The process of claim 12 including the step of placing said sheet between two layers of glass and exposing the assembly of sheet and glass layers to autoclave conditions of elevated temperature and pressure, whereby increased flow of the polymer forming the sheet occurs from one area of the sheet to another to fill an initially uneven gap between the glass layers in comparison with flow of polymer forming a sheet without the presence of ionomeric groups exposed to the same autoclave conditions, said increased flow resulting from the cleavage of bonds between ionomeric groups, said sheet having a 150° C. storage modulus value greater than $5 \times 10^5$ dynes/cm².

15. A process for increasing the resistance to blocking of plasticized polyvinyl butyral sheet containing residual hydroxyl groups and for increasing the flow thereof during lamination with glass layers which comprises incorporating into the formulation from which the sheet is made an effective block-reducing and flow-promoting amount of ionomeric groups chemically bound to oxygen atoms of adjacent precursor vinyl alcohol groups.

16. The process of claim 15 wherein said formulation contains up to about 10 mole % ionomeric groups.

17. The process of claim 16 wherein the ionomeric groups are formed of a metal sulfonate salt of an aldehyde.

* * * * *

UNITED STATES PATENT AND TRADEMARK OFFICE
CERTIFICATE OF CORRECTION

PATENT NO. : 4,999,078
DATED : March 12, 1991
INVENTOR(S) : A. Misra, D. J. David, A. M. DasGupta It is certified that error appears in the above-identified patent and that said Letters Patent is hereby corrected as shown below:

In col. 14, line 51, after the word configuration delete "(C" and insert ---$(CH_2)_n$---.

In col. 14, line 59, $SO_2-$ should read instead ---$SO_3-$ ---.

Signed and Sealed this

Fourteenth Day of July, 1992

Attest:

DOUGLAS B. COMER

*Attesting Officer*　　　　*Acting Commissioner of Patents and Trademarks*